United States Patent [19]
Brautigam

[11] 3,764,062
[45] Oct. 9, 1973

[54] CENTRIFUGE APPARATUS
[75] Inventor: Frank Charles Brautigam, Bryn Mawr, Pa.
[73] Assignee: Pennwalt Corporation, Philadelphia, Pa.
[22] Filed: Feb. 28, 1972
[21] Appl. No.: 229,965

[52] U.S. Cl. .................................................. 233/7
[51] Int. Cl. ............................................. B04b 1/00
[58] Field of Search ...................... 233/7, 1 R, 1 E, 233/3, 27, 28; 68/23

[56] References Cited
UNITED STATES PATENTS
2,600,372   6/1952   Milliken et al............................ 233/7

FOREIGN PATENTS OR APPLICATIONS
122,317   7/1948   Sweden................................... 233/7

*Primary Examiner*—George H. Krizmanich
*Attorney*—Edward A. Sager

[57] ABSTRACT

A helical screw conveyor of a centrifuge is provided with wear-resistant surfacing comprising a pre-formed backing tile of the same material as the conveyor, sub-assembled with a wear-resistant member and welded to said conveyor.

11 Claims, 12 Drawing Figures

Patented Oct. 9, 1973 3,764,062

CENTRIFUGE APPARATUS

This invention relates to centrifuges and conveying apparatus, especially those of the type having a rotatable scroll or screw conveyor for moving flowable material toward a discharge port. More particularly, the invention is directed to providing wear-resistant surfaces on the working edges and sides of a conveyor.

Although the art of centrifuge manufacture is well developed, as is the art of providing wear-resistant surfaces, rapid wear of contrifuge conveyor surfaces still remains a problem. The commonly used method of depositing hard surfacing by welding is not entirely satisfactory because deposited materials with best wear resistance tend to crack, spall, or lose adhesion as the thickness of the deposit is increased. On the other hand, multiple weld layers require extra heat input which not only degrades the alloy and reduces its overall abrasion resistance, but also reduces its adhesiveness to the base metal. Still another problem with weld-deposited, wear-resistant surfaces is that they vary in roughness, shape and thickness. Such variations result in localized unit pressures of unusually high magnitude, imposed by the abrasive particle on the wear-resistant surface, and therefore produces a greater rate of wear than would be experienced with smooth surfaces of uniform thickness and shape.

Previous attempts have also been made to secure preformed, wear-resistant members along the working edges of a conveyor, but have proved unsatisfactory. When such members are attached by a bolt or other mechanical means, dynamic unbalance conditions have been experienced with a conveyor rotated at high speed. In addition, a wear-resistant member can become detached during operation from a severely worn assembly, possibly causing damage to surrounding parts and in any event severely unbalancing the rotor.

Attempts have also been made in the past to braze or weld pre-formed, wear-resistant members directly to the working edges and sides of a conveyor. This has also provided unsatisfactory because the high heat input over a wide area sometimes causes serious warping of the conveyor and it is virtually impossible to ensure perfect adhesion of the parts. In the case of centrifuge conveyors operating at high speeds, an imperfect bond between a member and the conveyor is susceptible to breakage, again risking damage to surrounding parts and jamming. It is also difficult to repair such conveyors by welding or brazing replacement members in place because it requires the application of large quantities of heat to a broad area, and this adversely affects the bond of adjacent members.

The present invention overcomes the foregoing difficulties and unsatisfactory conditions by bonding a pre-formed wear-resistant member to a pre-formed backing tile and then welding the backing of the sub-assembly to the working edge of the metal conveyor. The wear-resistant member, preferably of sintered tungsten carbide material, is secured to the backing tile by controlled automatic or semi-automatic techniques appropriate to the materials involved, in order to make a strong, well-bonded, integral sub-assembly. Automatic torch brazing, fusion bonding, furnace brazing, adhesive bonding are among the techniques which may be employed. Finally, each sub-assembly is secured to the conveyor by electric arc welding or other conventional welding technique, a procedure which is facilitated and ensured of integrity and strength by precision casting the backing tile from the same metal as the conveyor.

The invention is also directed to specific constructions of the sub-assembled backing tile and wear-resistant member. Although the preferred embodiment employs sub-assemblies butted together entirely along side edges disposed in a radial plane, provision is also made for interlocking constructions of the members along their abutting side edges. Also, tile shapes tapered in a radial and axial direction provide a canted working edge on the conveyor. Shoulders on the backing tiles aid in positioning and securing the wear-resistant members thereon. Similarly, lips or flanges on the backing tiles aid in positioning and securing the sub-assemblies to the conveyor. These and other provisions are described hereinafter in detail.

It is a feature of the present invention that the sub-assemblies can be mass produced, and that securing the sub-assemblies to the conveyor can be done with automatic electric arc welding apparatus. Thus, wear-resistant surfaces can be provided at a reasonable manufacturing cost.

Not only is the labor cost of providing hard surfacing reduced by the present invention, but the material cost as well. It is estimated that the cost of each sub-assembly according to the preferred embodiment, is about one-quarter the cost of making a pre-formed member entirely of abrasion-resistant material such as tungsten carbide in a size and shape suited for direct securing to the conveyor.

Furthermore, with securely fastened wear-resistant members having a smooth surface and uniform shape and thickness, it is possible to offer a centrifuge which can operate at higher speeds and at higher pressures without abrasive damage, and which therefore has a greater throughput capacity.

In FIGS. 8 to 11 the wear-resistant members 42 are shown alone for the sake of clarity.

Figure 2:
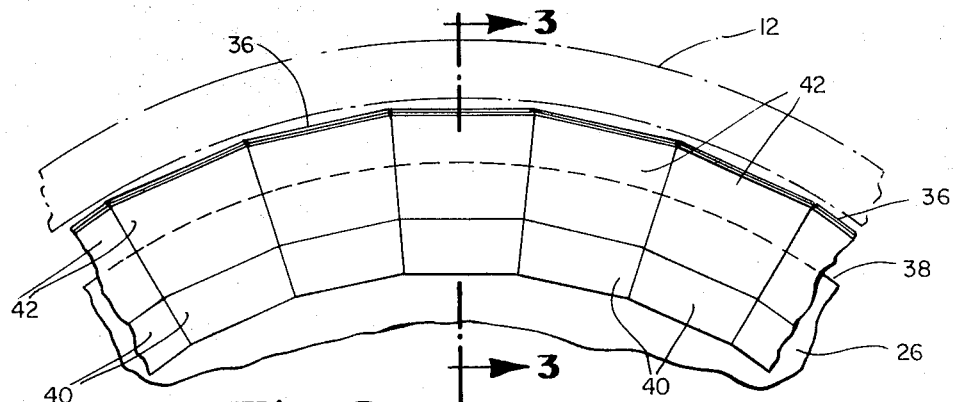
FIG. 2 is an enlarged view of a portion of a centrifuge conveyor, looking in the direction of the arrows 2—2 of FIG. 1.
Figure 4:
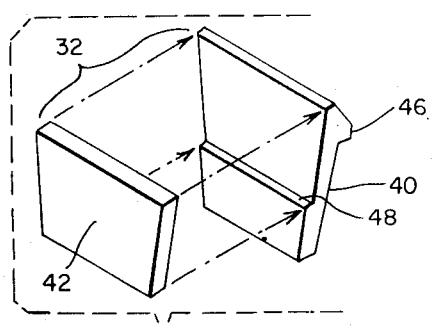
FIG. 4 is an exploded perspective view showing a sub-assembly of FIGS. 2 and 3 in detail.
Figure 5:
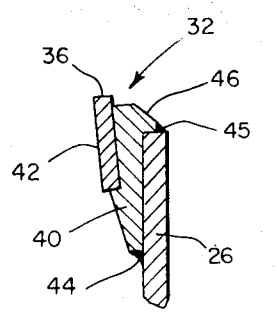
FIGS. 5, 6 and 7 are each radial sectional views, similar to FIG. 3 but looking in the opposite direction of the arrows 3—3, showing modified forms of the invention.
Figure 6:
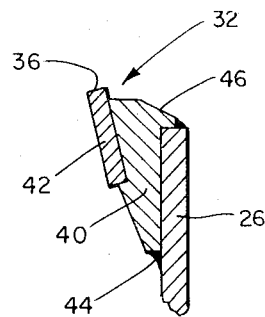
Figure 7:
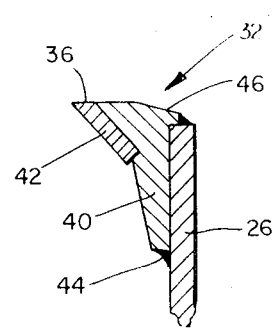
Figure 8:
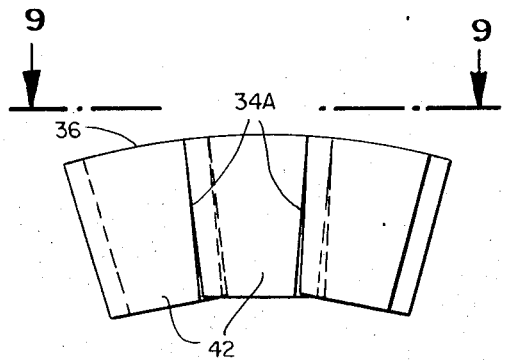
Figure 10:
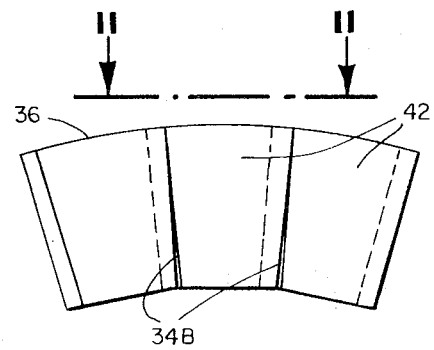
Figure 9:
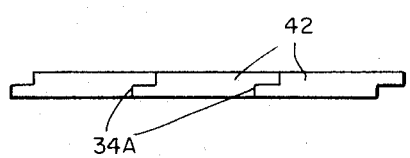
Figure 11:
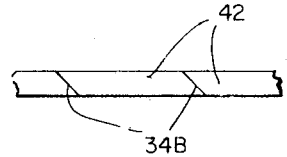
Figure 12:
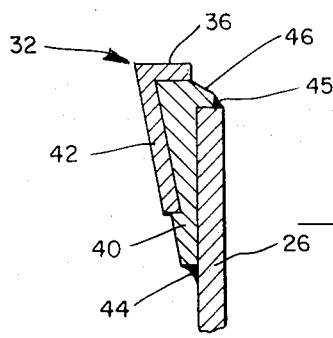

FIG. 8 is a view, looking axially of the centrifuge as in FIG. 2, illustrating a variation of the adjacent side edges of the wear-resistant members 42 of FIG. 4;

FIG. 9 is a view of the wear-resistant members of FIG. 8, looking in the direction of the arrows 9—9 of FIG. 8;

FIG. 10 is a view similar to FIG. 8, showing another variation;

FIG. 11 is a view of the members of FIG. 10, looking in the direction of the arrows 11—11 of FIG. 10; and FIG. 12 is a view similar to FIGS. 5, 6 and 7 showing still another modification of the invention.

Figure 1:
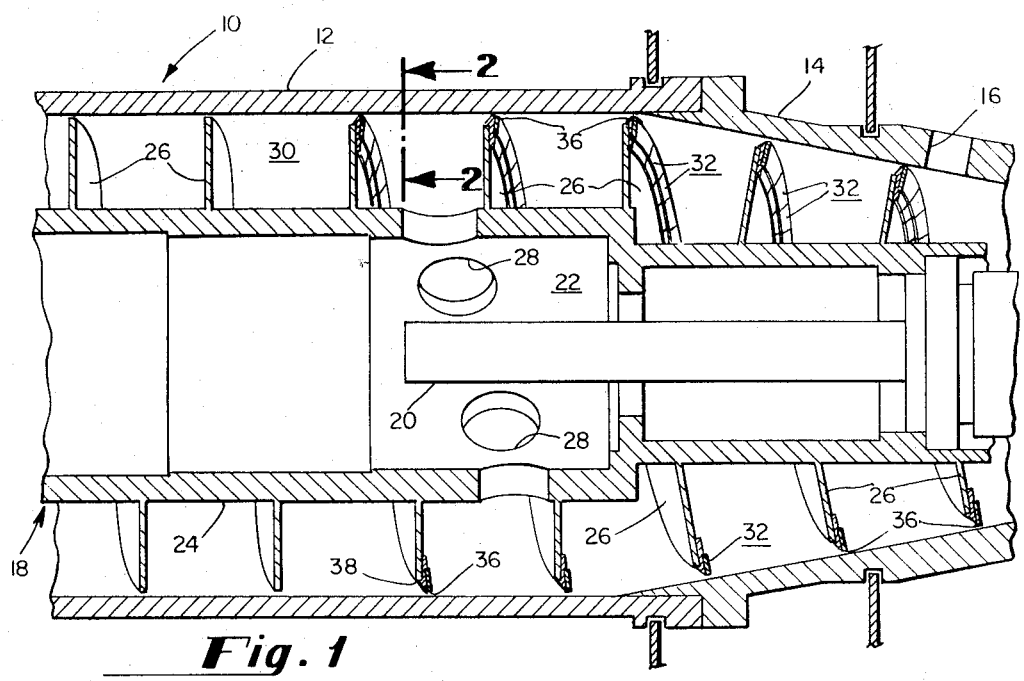
FIG. 1 is a fragmentary, longitudinal sectional view of a centrifuge embodying the invention.

The present invention has been applied to decanter centrifuges of the type shown more fully in U. S. Pat. No. 3,428,246, incorporated herein by reference, for separating a solids-liquid mixture. A centrifuge embodying the invention is partly shown in FIG. 1 of the present disclosure, and is designated by the numeral 10. The centrifuge 10 comprises an axially elongated bowl 12 of annular cross section which receives the solids-liquid mixture. The bowl 12 is adapted for rotation about a longitudinal axis. In addition to a main portion of generally cylindrical shape, the bowl 12 has a convergent end portion 14 of generally trunco-conical form. The inner surface of the end portion 14 of the bowl 12 gradually decreases in diameter towards solid discharge openings 16, thus providing a drying "beach" for solids moved out of the liquid pool toward the openings 16.

Coaxially mounted within the bowl 12 is a conveyor 18. The conveyor is adapted to be driven at a slight speed differential from that of the bowl 12 in order to convey solids as a result of the speed differential.

The solids-liquid mixture is delivered as feed to the interior of centrifuge 10 through a stationary feed tube 20. The tube 20 projects in axial direction and terminates concentrically of a feed chamber 22 defined by the interior of a hub 24. Carried on the outer surface of the hub 24 are outwardly projecting, helically formed screw flights 26 of the conveyor 18. The distal ends of the screw flights conform generally to the inner surface of the bowl 12, with a small clearance therebetween. The distal ends of the screw flights 26 are the working surfaces of the conveyor 18 which come in contact with settled solids resulting from centrifugal action, and the rotational movement of the conveyor 18 relative to the bowl 12 conveys the settled solids toward the solid discharge openings 16. Simultaneously, effluent moves in opposite direction and is discharged through liquid discharge openings (not shown) in the opposite end of the bowl 12.

Feed introduced to the feed chamber 22 exits radially therefrom through feed passages 28 in the hub 24 into a separation chamber 30 disposed between the outer surface of the hub 24 and the inner surface of the bowl 12.

In accordance with the invention the distal surfaces of the screw flights 26, or at least several of them within the tapered portion 14 of the bowl 12, are provided with wear-resistant surfacing by a series of assemblies 32 secured thereto. The positioning of the assemblies 32 on the screw flights 26 is shown in FIG. 2. It is to be noted that they are in abutting relationship with one another along their mutually facing, radially and perpendicularly extending side edges 34, and that their outermost edges 36 are in closely spaced relationship with the inner surface of the bowl 12 (shown in broken lines). In this view the outermost edge of the screw flight 26 is designated by the numeral 38. As will be described more fully, each assembly 32 comprises a backing tile 40 and a wear-resistant member 42.

Figure 3:
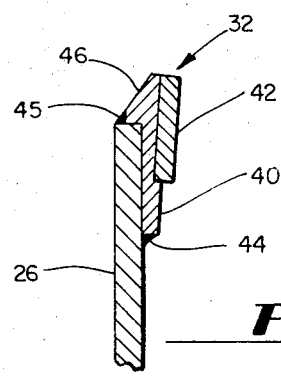
FIG. 3 is a sectional view taken along line 3—3 of FIG. 2.

In FIG. 3 an assembly 32 is shown welded to a screw flight 26, numerals 44 and 45 designating welds made preferably by manual electric arc or by semi-automatic or fully automatic metal inert gas (MIG) or tungsten inert gas (TIG) welding processes. The innermost weld 44 is between the lower or innermost edge of the backing tile 40 and a broad lateral surface of the screw flight 26. The outermost weld 45 is between the outer edge of the screw flight 26 and an axially extending lip 46 on the backing tile 40. The lip 46 extends away from the solids discharger or tapered end 14 of the bowl. The wear-resistant member 42 is positioned on a shoulder 48 of the backing tile 40; and the broad mutually facing surfaces of the tile 40 and member 42 are suitably bonded together. The assembly of the wear-resistant member 42 to the backing tile 40 is further illustrated in FIG. 4.

Preferred welding and bonding methods, as well as preferred materials will be discussed hereinafter. It will suffice for the present to note that the screw flights 26 and the backing tiles 40 are preferably made of stainless steel material, that the wear-resistant members are preferably made of sintered tungsten carbide material, and that the preferred means of bonding the member 42 to the tile 40 is by automatic brazing under controlled conditions.

It is also preferred that the backing tile 40 be preformed, preferably as a precision investment casting. When so made there are a variety of shapes available which not only facilitate manufacture and assembly, but which also lead to improvements in the operating characteristics of the centrifuge. Referring now to FIGS. 5, 6, 7, and 12, a sample of the variety of shapes of members 42 and tiles 40 is shown. In all of these embodiments the exposed surface of the member 42 is disposed at an acute angular inclination to the rotational axis and to the side of the conveyor flight 26 facing the tapered end 14 of the bowl 12. Although in these views the members 42 are mounted on the left hand side of the flight 26, instead of the right hand side as in FIG. 3, it is to be understood that the members 42 are always mounted on the side of the flight 26 facing the tapered end 14 of the bowl 12.

When made as shown in FIGS. 5, 6, 7 and 12, the working surfaces of the screw flight 26 are presented at an angle to the material being conveyed during the centrifuging operation. Stated another way, the surface of the member 42 facing the tapered end 14 of the bowl 12 is inclined from a plane normal to the rotational axis toward the tapered end 14, thereby making the working surface of the conveyor 18 concave in shape. In addition, as the angle of the working surface of the member 42, with respect to the inner bowl surface, is increased beyond a right angle as shown, the unit pressure of any abrasive particle on the members 42 is decreased. With a reduction of pressure, the rate of wear on the members 42 decreases at some mathematical exponential function of the pressure. For example, for every unit degree of magnitude of pressure decrease, the wear rate may decrease 2, 3 or 4 times. There is a different optimum angle for every type of solids material being conveyed, but in all cases the wear rate will be reduced from that experienced when the working surfaces of the members 42 are normal to the solid materials being conveyed. Reference numerals applied to parts shown in each of FIGS. 5, 6, 7 and 12 correspond to those of FIG. 3. It will be noted, however, that the outermost edge 36 of the member 42 in FIG. 7 is modified somewhat to conform more nearly to the inner surface of the bowl 12, with a small clearance therebetween.

The embodiment of FIG. 7 shows an assembly in which the surface of the member 42 is at a greater angular inclination than that of the tile 40 with respect to a plane normal to the rotational axis.

The side edges 34 of the assemblies 32 are shown in abutting relationship throughout their entire radial length in FIG. 2. While this is an ideal arrangement, it can be appreciated that with a conveyor 18 of varying distal edge diameter it is not possible to have such a perfect fit unless the angle of taper of the side edges 34, 34A and 34B (toward the axis) varies with each assembly 32 along the helical length of the flights 26 at the distal edge 38. It will also be appreciated that it is more practical to have an assembly 32 wherein the backing tile 40 and the wear-resistant member 42 are of standard size and shape, not only because size standardization is economical but also because it facilitates repair, servicing and assembly. In addition, the required parts inventory is minimized. With this in mind, the constructions of FIGS. 8 to 11 are proposed.

In the modification shown in FIGS. 8 and 9, the adjacent side edges 34A of member 42 form a lap joint, best seen in FIG. 9. The resulting adjacent assemblies will appear from an axial viewpoint as shown in FIG. 8. Here side edges 34A of adjacent member 42 are in abutting relationship along the outer edge 36 but a space exists between the side edges of members 42 along the inner edge. This situation occurs when assemblies 32 are mounted on a screw flight 26 having a larger than average distal edge diameter, assuming the angle of taper of the side edges 34A of each member 42 is made to provide a perfect fit at adjacent side edges 34 (like in FIG. 2) for the average diameter of the conveyor at 38. Although not shown, it can be readily seen that if the assemblies are mounted on a screw flight 26 having a smaller than average distal edge diameter, adjacent members 42 will be in touching relationship at the inner portion of the members 42 and they will be spaced apart along the outer edge thereof. Nevertheless, the lap joint still provides hard surfacing and wear-resistant protection at the working outer edges of the conveyor 18 because the members 42 overlap one another in the direction of rotation.

The modification of FIGS. 10 and 11 is an extension of the concept applied in FIGS. 8 and 9. Here, as best seen in FIG. 11, the side edges are designated 34B. It will be noted that the beveled side edges 34B are planar rather than stepped as in FIG. 9; but the side edges 34B extend at a sharp angular inclination from an axial plane, and again overlap in the direction of rotation. An angular bevel inclination of 45° is preferred, but obviously this angle can be varied appreciably without deviating from the broad concept of the invention, while accomplishing the said result. In FIG. 10, as in FIG. 8, there is an illustration of modified assemblies mounted on a larger than average diameter screw flight 26 so the outermost portions of edges 34B are in contact while innermost edge portions are spaced apart.

In the preferred embodiment of the present invention each member 42 and each backing tile 40 will be tapered along each side edge 34, 34A and 34B at an angle of 7 ½°, more or less. That is, the outermost corners of the members 42 will each have an included angle of about 82 ½° if the outermost edge 36 is straight as shown in FIG. 2, but this angle will be somewhat less if the outer edge is arcuate as in FIGS. 8 and 10. When the outermost edge of a member 42 is arcuate, it is also preferred that the outer edge, the lip 46, and the innermost edge of the backing tile 40 all be arcuately formed in the direction of rotation. The shoulder 48 of the tile 40 is made to conform to the shape of the corresponding inner edge of the member 42, preferably straight as best seen in FIG. 4.

The embodiment of FIG. 12 is similar to that of FIGS. 5 and 6, except that the member 42 is of generally L-shaped cross section to provide wear-resistant surfacing along the outermost edge 36.

It is a feature of the present invention that the assembly 32 is made by bonding the member 42 to the tile 40 by brazing techniques that are controlled, preferably automatically, prior to further assembly with the screw flight 26. Manual fusing or bonding techniques, such as manual brazing, is permissible but there is less insurance concerning the reliability and permanence of the bond, even though it is accomplished more conveniently and more successfully than if the member 42 were bonded directly to the screw flight 26. Automatic torch brazing, furnace brazing, induction brazing, fusion bonding, adhesive bonding are among the additional techniques suitable for securing the member 42 to the tile 40. Conventional welding techniques, such as electric arc welding, is preferably employed in welding each assembly 32 to the screw flight 26; and it is readily done either during original manufacture or during field repair, without reducing the effectiveness of the bond between the member 42 and the tile 40. It is, of course, very much preferred that the backing tile 40 and screw flight 26 be made of the same stainless steel or alloy steel material so that the final welding operation can be performed with ease and with assurance that a strong and permanent weldment will be obtained.

The assemblies 32 lend themselves to economical mass production, with the result that hard surfacing can be provided in a centrifuge with the minimum of extra cost. Moreover, with pre-formed tiles 40 and members 42 the final hard surfacing has a smooth surface and the working edges of the conveyor are of uniform shape and thickness, thus making it possible to operate the centrifuge at high speeds without subjecting the wear-resistant surfaces to any greater abrasion than is experienced with weld-deposited, wear-resistant surfaces operated at lower speeds.

Although it is preferred that the pre-formed backing tile 40 be of the same metal as the conveyor 18, the invention may be practiced by employing metals for the tile 40 and the conveyor 18 which are sufficiently compatable with one another for the welding or joining technique utilized to produce a satisfactory weld with acceptable corrosion resistance.

What is claimed is:

1. In centrifuge apparatus for separating a solids-liquid mixture, comprising:
   a. a rotatable, elongated, centrifuge bowl for receiving and separating the mixture; and
   b. a metal screw conveyor adapted to rotate relative to the bowl on a common longitudinal axis for moving the separated solids longitudinally of the bowl;
   c. said conveyor having distal surfaces helically formed about said axis and adapted to engage the solids during rotation thereof;
   that improvement comprising:
   d. wear-resistant surfacing on said distal surfaces provided by a helical series of assemblies secured thereto, each assembly including
   e. a pre-formed backing tile made of a metal which is weldable to the conveyor,
   f. a pre-formed wear-resistant member bonded to said backing tile, and
   g. a weldment between the conveyor and the tile of said assembly.

2. The invention according to claim 1 wherein the centrifuge bowl has a tapered end portion and the distal surfaces of said conveyor disposed within said tapered end portion are provided with said wear-resistant surfacing.

3. The invention according to claim 2 wherein the wear-resistant member is mounted on the side of said conveyor facing the end of the tapered end portion of said centrifuge bowl.

4. The invention according to claim 3 wherein the surface of each wear-resistant member facing the tapered end of the bowl is inclined from a plane normal to said axis toward said tapered end.

5. The invention according to claim 3 wherein the surface of each wear-resistant member facing the tapered end of the bowl is disposed at an acute angular inclination to said axis and to the side of said conveyor facing the tapered end of said bowl.

6. The invention according to claim 1 wherein said backing tiles have mutually adjacent side edges extending generally in radial and perpendicular direction relative to the longitudinal axis of said bowl.

7. The invention according to claim 6 wherein said adjacent side edges are stepped to provide a lap joint and overlap one another in the direction of rotation about said axis.

8. The invention according to claim 6 wherein said adjacent side edges are beveled and overlap one another in the direction of rotation about said axis.

9. The invention according to claim 1 wherein said backing tile is provided with an axially projecting shoulder adapted to engage the distal surface of said conveyor, for positioning said tile with respect to said conveyor.

10. The invention according to claim 1 wherein said backing tile is provided with an axially projecting shoulder adapted to engage the wear-resistant member, for positioning said member with respect to said tile.

11. The invention according to claim 1 wherein the backing tile is made of the same metal as the conveyor.

* * * * *